US009342271B2

(12) United States Patent
Hoeller et al.

(10) Patent No.: US 9,342,271 B2
(45) Date of Patent: May 17, 2016

(54) PROCESSING DEVICE AND METHOD FOR MULTIPLYING POLYNOMIALS

(71) Applicant: Infineon Technologies AG, Neubiberg (DE)

(72) Inventors: Andrea Hoeller, Graz (AT); Tomaz Felicijan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 293 days.

(21) Appl. No.: 14/043,937

(22) Filed: Oct. 2, 2013

(65) Prior Publication Data

US 2015/0095395 A1 Apr. 2, 2015

(51) Int. Cl.
*G06F 7/00* (2006.01)
*G06F 7/38* (2006.01)
*G06F 7/52* (2006.01)
*G06F 7/72* (2006.01)

(52) U.S. Cl.
CPC ....................................... *G06F 7/724* (2013.01)

(58) Field of Classification Search
CPC ........................................................ G06F 7/724
USPC .................................. 708/492, 620, 625, 523
See application file for complete search history.

(56) References Cited

U.S. PATENT DOCUMENTS

| 4,833,678 A | * | 5/1989 | Cohen | .................. | H03M 13/151 |
| | | | | | 714/781 |
| 6,026,420 A | * | 2/2000 | DesJardins | ............. | G06F 7/724 |
| | | | | | 708/492 |

OTHER PUBLICATIONS

D. Hankerson, S. Vanstone, A. J. Menezes, "Guide to Elliptic-Curve Cryptography", Springer, 2004.

* cited by examiner

*Primary Examiner* — Tan V. Mai

(57) ABSTRACT

According to one embodiment, a processing device for multiplying a first polynomial with a second polynomial is described including a first memory storing a representation of the first polynomial, a controller configured to separate the first polynomial into parts, a second memory storing predetermined results of the multiplications of the second polynomial with possible forms of the parts of the first polynomial, a third memory for storing the result of the multiplication, an address logic, configured to determine, for each part of the first polynomial, a start address of a memory block of the second memory based on the form of the part and the location of the part within the first polynomial and an adder configured to add, for each determined address of the memory block of the second memory, the content of the memory block of the second memory at least partially to the contents of the third memory, wherein the data element of the third memory to which the content of a data element of the memory block of the second memory is added is the same for a plurality of the parts of the first polynomial.

18 Claims, 5 Drawing Sheets

FIG 5

PROCESSING DEVICE AND METHOD FOR MULTIPLYING POLYNOMIALS

TECHNICAL FIELD

The present disclosure relates to processing devices and methods for multiplying polynomials.

BACKGROUND

A multiplication of polynomial binary fields is often used in cryptographic operations. One example is Elliptic-Curve Cryptography (ECC) where the multiplication typically accounts for about 80% of the execution time of a single ECC point multiplication.

Such a multiplication requires a lot of computational resources and is typically executed using dedicated hardware. However, often a software solution is preferred for various reasons such as flexibility and area.

Accordingly, efficient approaches for performing polynomial multiplications are desirable.

SUMMARY

According to one embodiment, a processing device for multiplying a first polynomial with a second polynomial is provided including a first memory storing a representation of the first polynomial, a controller configured to separate the first polynomial into parts, a second memory storing predetermined results of the multiplications of the second polynomial with possible forms of the parts of the first polynomial, a third memory for storing the result of the multiplication, an address logic, configured to determine, for each part of the first polynomial, a start address of a memory block of the second memory based on the form of the part and the location of the part within the first polynomial and an adder configured to add, for each determined address of the memory block of the second memory, the content of the memory block of the second memory at least partially to the contents of the third memory, wherein the data element of the third memory to which the content of a data element of the memory block of the second memory is added is the same for a plurality of the parts of the first polynomial.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 5 illustrates a processing of the processing device of FIG. 4.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

An acceleration of polynomial binary field multiplication may be achieved by a dedicated coprocessor or an instruction set extension (ISE). Although a dedicated coprocessor may typically achieve a good speed-up it requires much chip area. Thus this option may not be well suited for small-footprint applications. Further, an extension of an instruction set does not require much area, but needs free opcodes for the instructions and compiler adaptations.

In the following, an approach of the $GF(2^m)$ multiplication is described.

First, the representation of elements in binary fields is introduced.

An element $a(z) \in GF(2^m)$ may be represented in polynomial basis in the form $$a(z) = a_{m-1}z^{m-1} + \ldots + a_2z^2 + a_1z + a_0, a_i \in \{0,1\}.$$

The associated binary vector $a = (a_{m-1}, \ldots, a_2, a_1, a_0)$ has the length m. The calculation $z^k a(z)$ means shifting the vector k-times left.

In a W-bit architecture, one element can be stored in an array with t words, where $t = \lceil m/W \rceil$.

In the following, it is assumed that the coefficients $a_i$ are stored in an array A. This is illustrated in FIG. 1.

Figure 1:
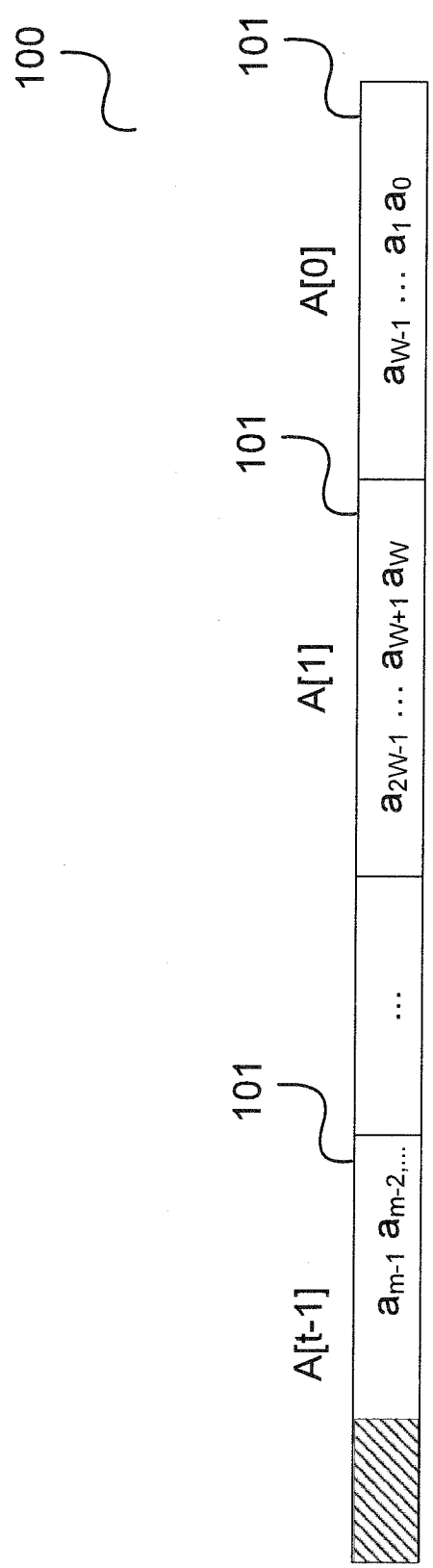
FIG. 1 shows a coefficient array.

FIG. 1 shows an coefficient array 100.

The array 100, denoted by A, includes a plurality of words 101, wherein each word 101 stores W binary coefficients $a_i$. A[i] stands for the $i^{th}$ word of a(z) (counted from right to left in the illustration of FIG. 1).

In the following, similar notations are used for arrays $B_u$ and array C.

To calculate a $GF(2^m)$ multiplication in software, the left-to-right multiplication with windows may be used. This is described in the following.

The multiplication of two polynomials a(z) and b(z) can be written as $$c(z) = a(z) \cdot b(z) = a_{m-1}z^{m-1}b(z) + \ldots + a_2z^2b(z) + a_1zb(z) + a_0b(z).$$

with coefficient vectors $a \in GF(2^m)$, $b \in GF(2^m)$ and $a \in GF(2^{2m-1})$. In the following, it is assumed that the coefficient vectors include the coefficients corresponding to higher exponents further to the left, as for example in $a = (a_{m-1}, \ldots, a_2, a_1, a_0)$.

The binary vector of c has the length (2m−1), thus a reduction method may be applied to reduce the result to m bits. In the following only the multiplication method is described. The result may be may be afterwards reduced.

In order to simplify the explanation, firstly the left-to-right multiplication without windows (or with a window size of one) is described and afterwards an arbitrary window size is introduced.

The left-to-right multiplication is based on the observation that if $z_k b(z)$ has been computed for all k, where $0 \leq k < W$, then $z^{wj+k}b(z)$ can be determined by appending j words, where all bits are zero, to the right of the vector representation (i.e. the coefficient vector) of $z^k b(z)$. This fact can be used when adding $z^{wj+k}b(z)$ to c(z). Instead of inserting zeroes at the right of the vector, the addressing of C is adapted. More precisely, the $i^{th}$ word of $z^k b(z)$ is added to the result array C[i+j]. In binary fields addition means to perform a bitwise XOR.

The bits of the words of A are processed from left-to-right. The method starts processing the leftmost bit of every word. If this bit is set in the word A[j], then every word B[i], where $0 \le i < t$ is added to C[i+j]. Thereafter the accumulator C is shifted one bit left to account for the position of the bit within the word A[j].

The procedure then continues with considering the second highest bit of every word of A and repeating the same calculations. These steps are repeated until all bits of all words are processed.

This calculation can be accelerated by using the windowing method with windows of width w. This approach processes w bits of every word of A at a time. For this, a precalculation is carried out. First, the multiplication $u(z) \cdot b(z)$ for all polynomials u(z) with a degree less than the window size w is calculated. The result of $u(z) \cdot b(z)$ for a certain u is stored in the array $B_u$.

In general, the number of precalculated elements is equal to $2^w - 1$.

After the precalculation step, the words of A are processed similarly as described above. Instead of processing one bit of the word A[j] at a time as above, w bits of every word A[j] are processed at a time. The currently processed w bits of a word of A represent the coefficients of u(z). According to this u, the content of the right $B_u$, which is for example stored in RAM, is added to C. After processing the first window of every word, the result is shifted left by w-bits to account for the position of the windows within the words A[j]. This procedure is repeated until all windows are processed.

This processing may for example be written in pseudo-code as follows:

---

Input: Binary polynomials a(z) and b(z) of degree at most m − 1

Output: c(z) = a(z) · b(z)

1  C ← 0
2  Compute $B_u$ = a(z) · b(z) for all polynolmials u(z) of degree at most w − 1
3  for k ← (W/w) − 1 to 0 do
4      for j ← t − 1 downto 0 do
5          Let u = $(u_{w-1}, ..., u_1, u_0)$, where $u_i$ is bit (wk + i) of A[j]
6          for i ← 0 to t − 1 do C[i + j] ← C[i + j] ⊕ $B_u$[i]
7      if k ≠ 0 then C ← $z^w$ · C

---

An example with window size w=4, wordsize W=8, m=163 and t=21 is given in the following. The following values of array A are assumed:

| A[20] | A[19] | | A[0] |
|---|---|---|---|
| 0000 0110 | 0101 1100 | ... | 1101 0010 |

In the precalculation phase 15 elements are calculated and stored in RAM. The following equations show the polynomial, binary vector and integer representation of the precalculated elements:

$b_1 = b$
$b_2 = z \cdot b(z) = 10_b \cdot b = 2_d \cdot b$
$b_3 = (z + 1)b(z) = 11_b \cdot b = 3_d \cdot b$
$b_4 = z^2 b(z) = 100_b \cdot b = 4_d \cdot b$
$b_5 = (z^2 + 1)b(z) = 101_b \cdot b = 5_d \cdot b$
$b_6 = (z^2 + z)b(z) = 110_b \cdot b = 6_d \cdot b$
...
$b_{15} = (z^3 + z^2 + z + 1)b(z) = 1111_b \cdot b = 15_d \cdot b$ Thereafter, 4 bits of every word are considered to determine u. The words are processed from left-to-right.

The outer loop in line 3 of the above pseudo-code starts with k=1 and the upper 4 bits are used to determine u:

Process A[20]:u=$0000_b$→continue
Process A[19]:u=$0101_b$→add ($B_5$[0], $B_5$[1], ... , $B_5$[20]) to (C[19], C[20], ... , C[39])
... Continue processing A[2], A[3], ... , A[19]
Process A[0]:u=$1101_b$→add ($B_{13}$[0], $B_{13}$[1], ... , $B_{13}$[20]) to (C[0], C[1], ... , C[20])

Thereafter the whole 41 words of C (C[40] ... C[0]) are shifted 4-times left

Then k gets 0 and the other window of every word is regarded:

Process A[20]: u=$0110_b$→add ($B_6$[0], $B_6$[1], ... , $B_6$[20]) to (C[20], C[21], ... , C[40])
Process A[19]: u=$1100_b$→add ($B_{12}$[0], $B_{12}$[1], ... , $B_{12}$[20]) to (C[19], C[20], ... , C[39])
... Continue processing A[2], A[3], ... , A[19] ...
Process A[0]: u=$0010_b$→add ($B_2$[0], $B_2$[1], ... , $B_2$[20]) to (C[0], C[1], ... , C[20])

The left-to-right multiplication may be implemented using pointers to address the various arrays. However, the left-to-right multiplication frequently accesses the memory consecutively, which causes many pointer calculations.

According to one embodiment, the addition loop of the left-to-right multiplication is accelerated by using virtual addressing. Virtual addressing allows writing a code segment with fixed virtual addresses. Before executing these code segments, the physical position, where the virtual addresses map to, are set and thus one code segment can perform operations on different memory locations without introducing additional pointer calculations. Furthermore, with virtual addressing it is possible to achieve a high utilization of general purpose registers (GPRs) without introducing much control overhead. This reduced the number of expensive memory accesses. Thus, with the hardware/software codesign approach to accelerate $GF(2^m)$ multiplication with virtual addressing according to one embodiment, a high-speed up with very low area requirements without the need to change the instruction set may be achieved.

Figure 2:
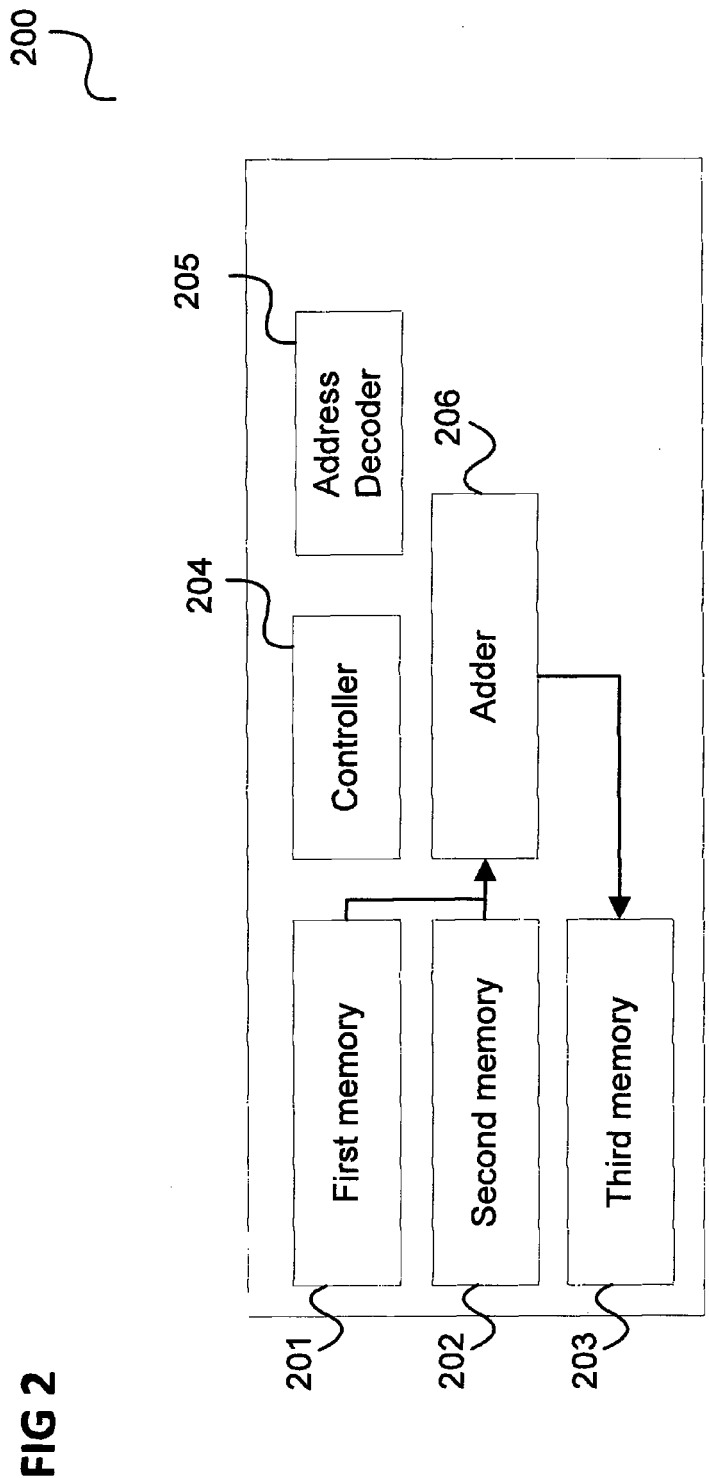
FIG. 2 shows a processing device for multiplying a first polynomial with a second polynomial according to an embodiment.

For example, a processing device is provided as illustrated in FIG. 2.

FIG. 2 shows a processing device 200 for multiplying a first polynomial with a second polynomial according to an embodiment.

The processing device includes a first memory 201 storing a representation of the first polynomial (e.g. corresponding to the content of A in the above example), a controller 204 configured to separate the first polynomial into parts and a second memory 202 storing pre-determined results of the multiplications of the second polynomial with possible forms of the parts of the first polynomial (e.g. corresponding to the content of the $B_u$ of the above example).

The processing device 200 further includes a third memory for storing the result of the multiplication (e.g. corresponding to C in the above example); Furthermore, the processing device 200 includes an address logic 205 configured to determine, for each part of the first polynomial, a start address of a memory block of the second memory 202 based on the form of the part and the location of the part within the first polynomial and an adder 206 configured to add, for each determined address of the memory block of the second memory 202, the content of the memory block of the second memory 202 at least partially to the contents of the third memory 203, wherein the data element of the third memory 203 to which the content of a data element of the memory block of the second memory 202 is added is the same for a plurality of the parts of the first polynomial.

According to one embodiment, in other words, a memory block (also referred to as virtual memory block) is used whose position with in the second memory is shifted in accordance with the pre-determined partial multiplication result (such as stored in the $B_u$ in the example above) that is currently needed (depending on the currently processed part of the first polynomial, e.g. the current window of A in the example above) and the location within the first polynomial that is currently processed (i.e. the location of the current window of A in the example above) such that the correct pre-determined partial multiplication result is added to the correct part of the result vector (for example that the result corresponding to a window that is further left in the first polynomial is added further left to the result vector) even though each data element of the memory block (e.g. each virtual address) is associated with a fixed data element of the result memory (at least for a part of the iterations). This fixed association allows avoiding pointer operations.

According to one embodiment, each part of the first polynomial includes a consecutive subset of terms of the first polynomial according to an ordering of the terms of the first polynomial according to increasing or decreasing exponent.

For example, the parts of the first polynomial include an equal number of coefficients of the polynomial (which may be zero).

The representation of the first polynomial is for example the set of coefficients of the first polynomial. In other words, the coefficients of the first polynomial are for example written according to an ordering of its terms according to ascending or descending exponents (as for example the coefficient vectors given above) and the resulting vector of coefficients is separated into parts of equal size.

The possible forms of the parts of the first polynomial for example include the possible combinations of possible coefficients of the parts. For example, if a part corresponds to a certain number of terms of the first polynomial (or in other words, to a certain number of exponents), the possible forms include the possible combinations of such a number of coefficients.

According to one embodiment, the third memory includes register memory elements and RAM memory elements.

According to one embodiment, the address logic is configured to determine the start address of the memory block of the second memory based on the form of the part such that the memory block of the second memory at least partially includes the pre-determined result of the multiplications of the second polynomial with the form of the part of the first polynomial.

The address logic is for example configured to determine the start address of the memory block of the second memory based on the location of the part within the first polynomial such that the memory block of the second memory includes the pre-determined result of the multiplications of the second polynomial with the form of the part of the first polynomial in data elements which the adder adds to data elements of the third memory corresponding to the location of the part within the first polynomial.

The address logic is for example configured to determine the start address of the memory block of the second memory based on the location of the part within the first polynomial such that the memory block of the second memory includes the pre-determined result of the multiplications of the second polynomial with the form of the part of the first polynomial in data elements which the adder adds to data elements of the third memory corresponding to exponents of the result of the polynomial multiplication as given by the exponents of the part of the first polynomial. In other words, the pre-determined result is added to the representation of the multiplication result in the third memory according to the exponents of the part of the first polynomial.

According to one embodiment, each data element of the first memory is configured to store the coefficient of a term of the first polynomial having an exponent associated with the data element. According to one embodiment, each data element of the second memory is configured to store the coefficient of a term of a result of the multiplications of the second polynomial with a form of the parts of the first polynomial having an exponent associated with the data element. According to one embodiment, each data element of the third memory is configured to store the coefficient of a term of the result of the polynomial multiplication having an exponent associated with the data element. In other words, each the coefficient of the various polynomials is stored in a data element associated with the exponent to which the coefficient belongs.

The first polynomial and the second polynomial are for example polynomials with binary coefficients.

The processing device is for example a cryptographic processor and is configured to perform a cryptographic operation based on the result of the multiplication of the first polynomial with the second polynomial.

According to one embodiment, the address logic is configured to determine a candidate start address of the memory block of the second memory based on the form of the part and an address offset based on the location of the part within the first polynomial and to determine the start address of the memory block of the second memory based on the candidate start address and the offset.

For example, the candidate start address is the start address in the second memory of the pre-determined result of the multiplications of the second polynomial with the part of the first polynomial.

According to one embodiment, the data element of the third memory to which the content of a data element of the memory block of the second memory is added is constant for a first subset of the parts of the first polynomial and is constant for a second subset of the parts of the first polynomial.

For example, the first subset and the second subset are each subsets of consecutive parts of the first polynomial according to an ordering of the parts of the first polynomial according to increasing or decreasing exponent. In other words, the processing is separated in two (or more) parts wherein during each part, the mapping of the memory block of the second memory to the third memory is constant.

The components of the processing device (e.g. the controller, the address logic and the adder) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 3:
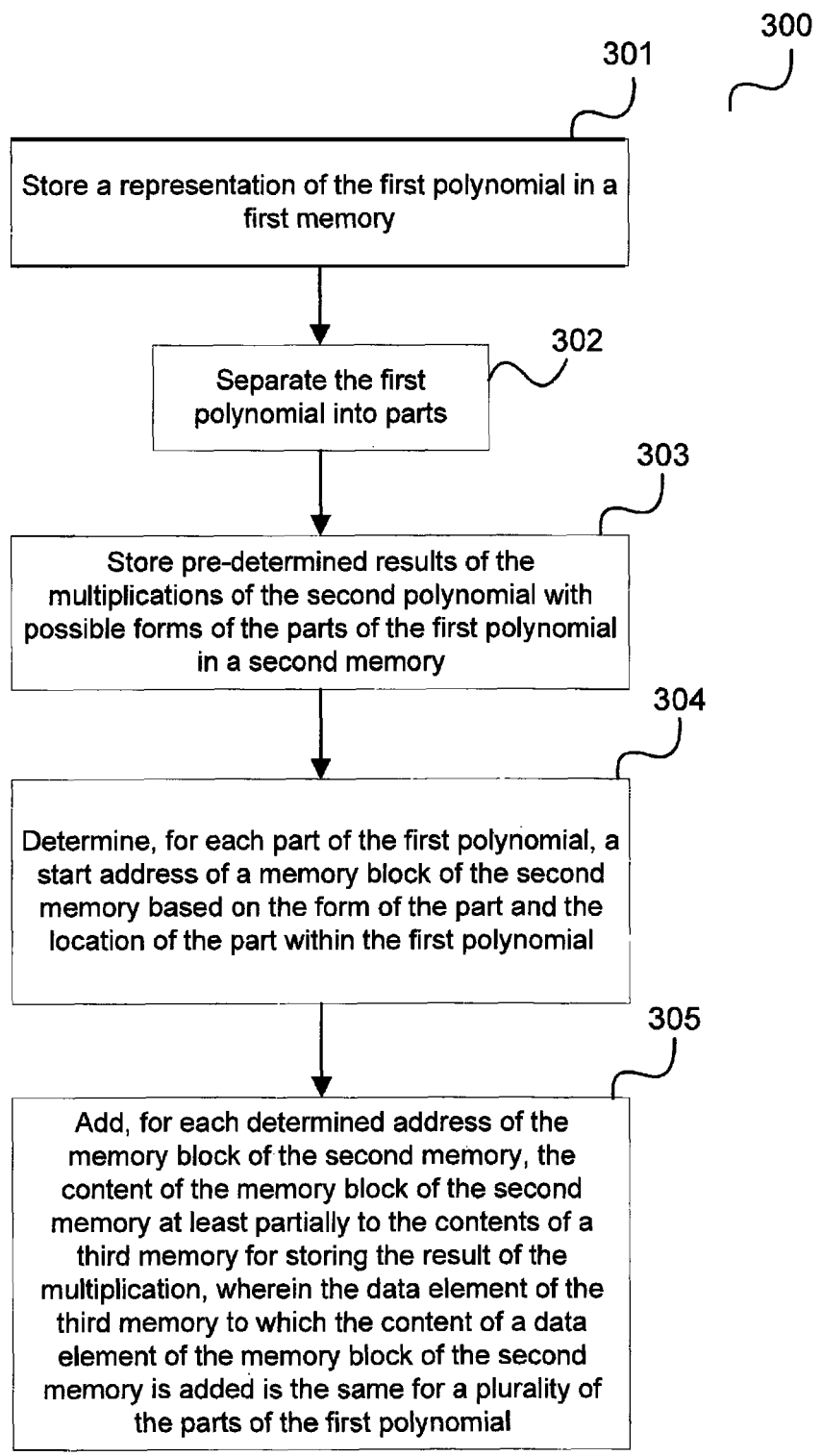
FIG. 3 shows a flow diagram illustrating a method for multiplying polynomials according to an embodiment.

The processing device for example carries out a method as illustrated in FIG. 3.

FIG. 3 shows a flow diagram 300.

The flow diagram 300 illustrates a method for multiplying a first polynomial with a second polynomial.

In 301, a representation of the first polynomial is stored in a first memory.

In 302, the first polynomial is separated into parts.

In 303, pre-determined results of the multiplications of the second polynomial with possible forms of the parts of the first polynomial are stored in a second memory.

In 304, for each part of the first polynomial, a start address of a memory block of the second memory is determined based on the form of the part and the location of the part within the first polynomial.

In 305, for each determined address of the memory block of the second memory, the content of the memory block of the second memory is at least partially added to the contents of a third memory for storing the result of the multiplication, wherein the data element of the third memory to which the content of a data element of the memory block of the second memory is added is the same for a plurality of the parts of the first polynomial.

It should be noted that embodiments described in context of the processing device 200 are analogously valid for the method illustrated in FIG. 3 and vice versa.

In the following, examples are described in more detail.

In the embodiment described in the following, the performance of the GF($2^m$) multiplication C=A*B as described above, i.e. with windowed left-to-right multiplication, is improved. Specifically, in this embodiment, the addition loop of the left-to-right multiplication with windows (lines 4 to 6 in the pseudo code given above) is accelerated. The precalculation and shifting steps are not influenced in this embodiment.

In the following, it is assumed that the $B_u$ are precalculated as described above and stored in RAM. To keep the address logic simple, the different $B_u$ are for example consecutively stored as shown in FIG. 4.

Figure 4:
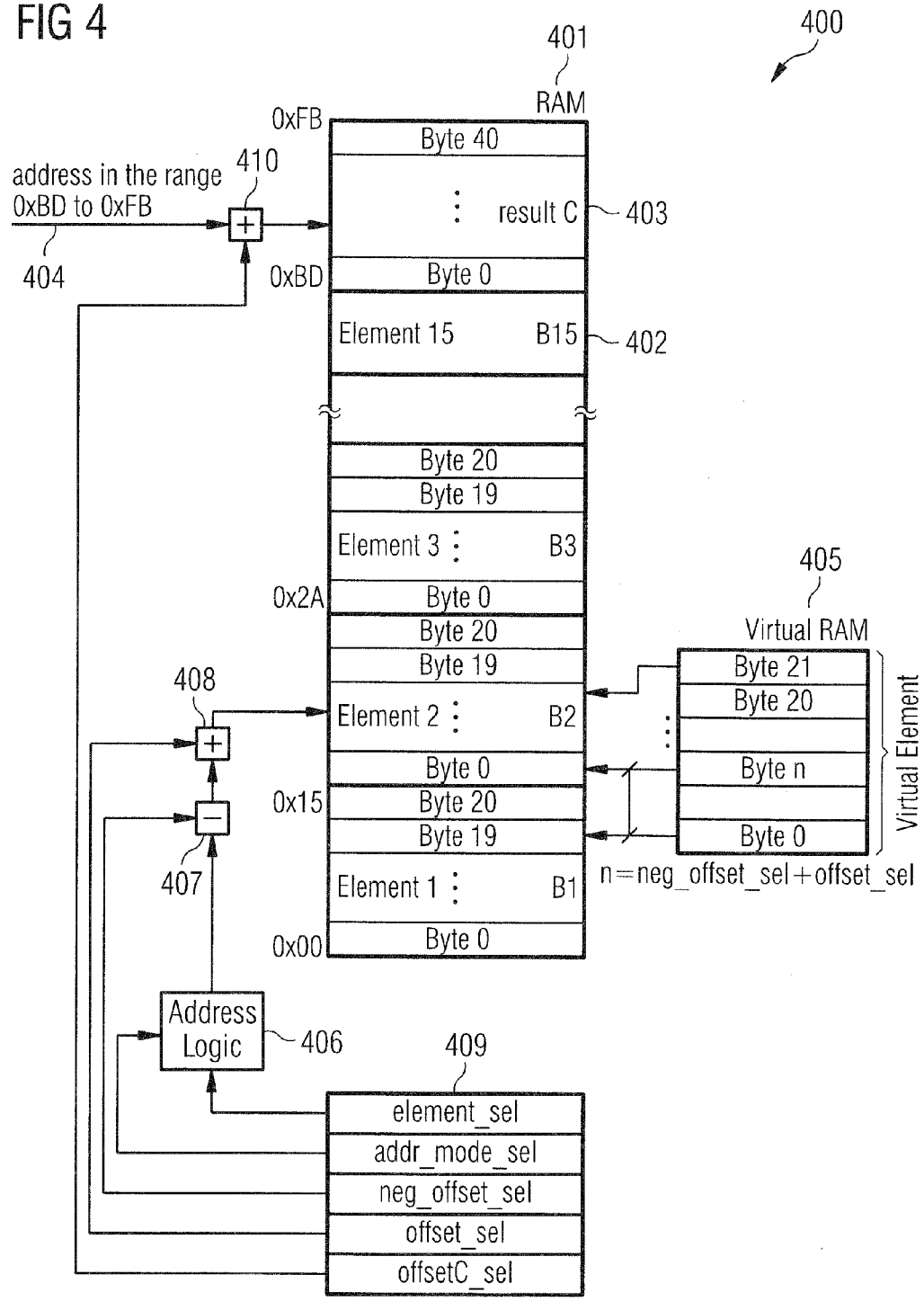
FIG. 4 shows an example of a processing device according to an embodiment.

FIG. 4 shows a processing device 400.

The processing device 400 includes a RAM (Random Access Memory) 401.

The RAM 401 stores the $B_u$ consecutively in a first memory area 402 and the array C in a second memory area 403. The first memory area 401 can be seen to correspond to the second memory 202 and the second memory area 403 can be seen to correspond to the third memory 203. The first polynomial, i.e. the array A, is stored in a memory (not shown) corresponding to the first memory 201 which may also be part of RAM 401 or a separate memory.

The result array C is stored in a fixed position in RAM 401. The memory accesses to the words of A are not influenced by virtual addressing. It is assumed that a register holds the start address of A.

A processor (not shown) accesses the RAM 401 by means of an address line 404 which allows accessing the second memory area 403 (i.e. C) and by means of a virtual RAM 405 to the first memory area 402 (i.e. the $B_u$). The virtual RAM 405 can be seen as a range of addresses (in the following example referred to as array VE[0] to VE[20]). An address logic 406, a subtractor 407 and a first adder 408 implement a virtual address mechanism and map elements of the virtual RAM 405 to data elements of the first memory array 402 in accordance with the contents of registers 409 as described below.

The embodiment described in the following can be seen to be based on the approach of changing the pointer calculation when the processor accesses RAM 401 as described below.

The registers 409 include five parameters, which can for example be set by writing to predefined addresses (associated with the registers 409).

The virtual element (or virtual RAM) 405 includes a continuous address range of t+1 (22 in this example) words. The virtual addressing mechanism maps these addresses to t+1 adjoined physical words of the first memory area 401. Illustratively, the virtual element points to one of the precalculated B.

Among the five parameters, the parameters element_sel and addr_mode_sel define u. The parameter element_sel has a width of the wordsize W. The parameter addr_mode_sel indicates which bits of element_sel are used for the determination of u. More specifically, addr_mode_sel defines a window of element_sel. For example, if the window size of the left-to-right multiplication is w=4 and the wordsize is W=8, there are two possible address modes. If addr_mode_sel=0, the first window is chosen, thus u=element_sel[7:4]. Otherwise, u is determined by the first four bits: u=element_sel[3:0]. For example if u=1, then the address logic maps the virtual element to the physical address location of $B_1$.

By means of the subtractor 407 and the adder 408 further parameters are considered for the address translation: The parameter neg_offset_sel is subtracted from the address output by the address logic 406 and the parameter offset_sel is added to the address output by the subtractor 407.

For example, let W=8, w=4, neg_offset_sel=0, offset_sel=0, element_sel=$00100110_b$ and addr_mode=0. Thus, u=$0010_b$=$2_d$:

21 addresses of the virtual RAM 405 point to the 21 words of $B_2$. This means that the first byte of the virtual element VE[0] points $B_2$[0] the second byte of the virtual element VE[1] points to $B_2$[1], and so on.

If neg_offset_sel=3, offset_sel=10 and the remaining parameters stay the same, the $i^{th}$ word of virtual RAM 405 points to $B_2$[i+offset_sel-neg_offset_sel]. Thus the first byte of the virtual element VE[0] points to $B_2$[7], the second byte of the virtual element VE[1] points to $B_2$[8], and so on.

The parameter offsetC_sel which is also stored in registers 409 has no influence on the conversion of the virtual RAM addresses (i.e. the VE[0] . . . VE[t]) to physical addresses. It just influences the addressing of those words in RAM, where the final result C is stored. Whenever a pointer points to one of these addresses and the processor supplies a corresponding address via address line 404, a second adder 410 adds the value of offsetC_sel to this address.

According to one embodiment, the fact that nearly all words of C which are affected during one addition are manipulated again by the successive addition is exploited. Below, this approach is described for a window length of w=4, a wordsize of W=8, a parametersize m=163 and 13 available registers (e.g. registers of the processor, not shown in FIG. 4). However, it could also be adapted for other parameters.

In the following, a pseudo-code is given which takes advantage of available registers and reduces the number of pointer calculations with low control overhead.

```
ADDR_MODE_SEL ← 0
call PROCESS_WINDOW
ADDR_MODE_SEL ← 1
call PROCESS_WINDOW
ret
PROCESS_WINDOW:
Reset registers
OFFSETC_SEL ← 0
for k ← 0 to 9 do call MULT_LOOP
Store and load registers from/to C
OFFSETC_SEL ← 10
for k ← 0 to 10 do call MULT_LOOP
MULT_LOOP:
ELEMENT_SEL ← value stored in A_ptr    // A_ptr ... address of A
A_ptr ← A_ptr + 1
NEG_OFFSET_SEL ← k
call ADD_B1_[k]
if k ≠ 0 then
     OFFSET_SEL ← 9
     call ADD_B2_[k]
ret
ADD_B1_0: C[0] ← C[0] ⊕ V E[0]          // VE... virtual element
ADD_B1_1: C[1] ← C[1] ⊕ V E[1]
...
ADD_B1_7: C[7] ← C[7] ⊕ V E[7]
ADD_B1_8: R0 ← R0 ⊕ V E[8]
ADD_B1_9: R1 ← R1 ⊕ V E[9]
...
ADD_B1_20: R12 ← R12 ⊕ V E[20]
ret
ADD_B2_10: C[30]←C[30] ⊕ VE[21]
ADD_B2_9: C[29] ← C[29] ⊕ V E[20]
ADD_B2_8: C[28] ← C[28] ⊕ V E[19]
...
ADD_B2_1: C[21] ← C[21] ⊕ V E[12]
OFFSET_SEL ← 0
ret
```

It should be noted that according to this pseudo-code, in contrast to the pseudo-code given above, the A[j] are processed in ascending order.

The operations on those words of C, which are altered most frequently, are performed with registers: instead of loading values from memory and storing them back to the same position, all operations which target these addresses are performed with predefined registers. This is illustrated in FIG. 5.

Figure 5:
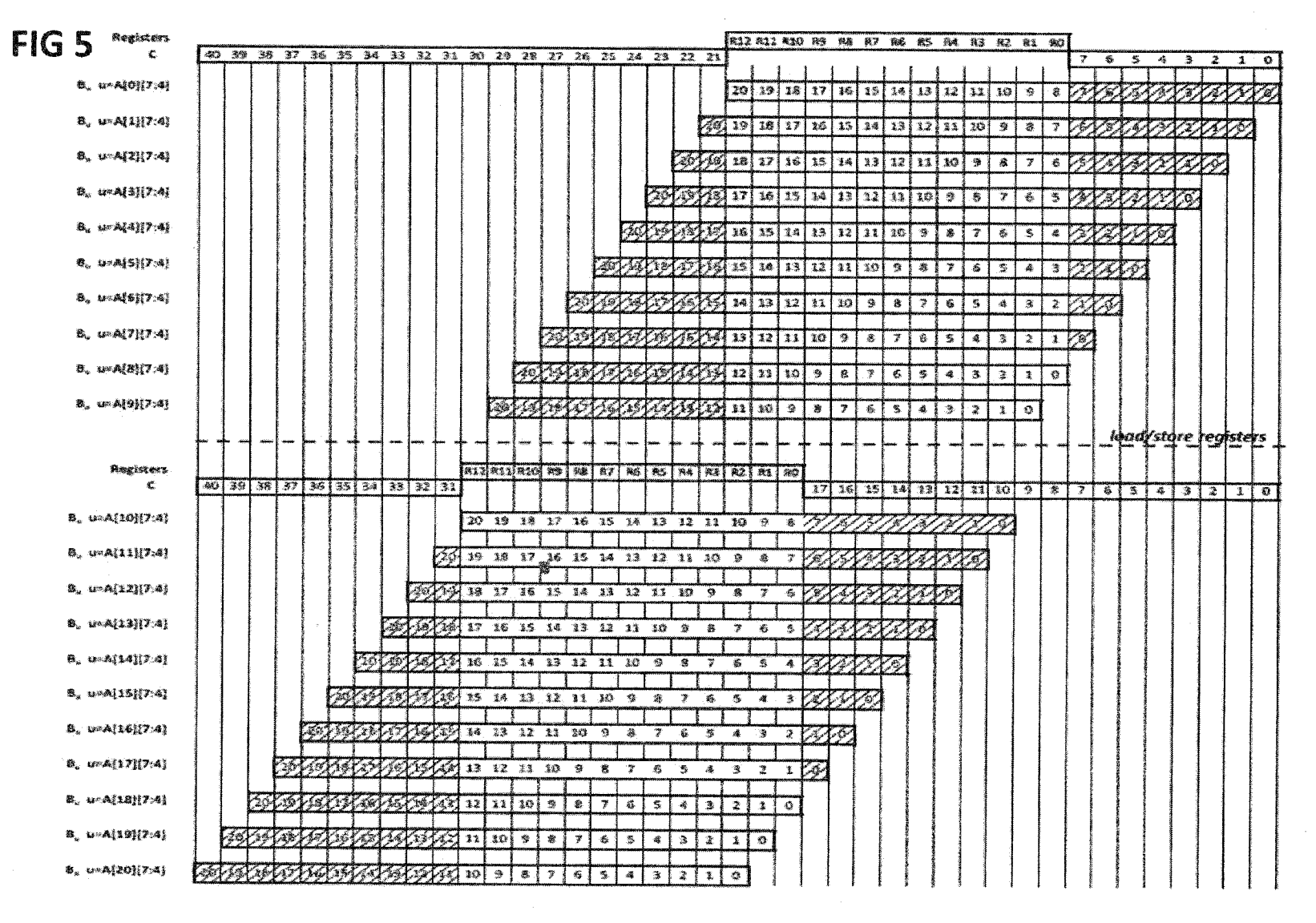

FIG. 5 illustrates the processing for the left window for all 21 words of the array A. For each A[j], the 21 bytes which are added to C for this A[j] are shown from right to left, wherein the bytes of C go from right to left from C[0] to C[40]. From A[1] to A[9] the bytes C[8] to C[20] are stored in the registers while from A[10] to A[20] the bytes C[18] to C[30] are stored in the registers. Accordingly, at the transition from A[9] to A[10] the register contents are stored to the memory as C[8] to C[20] and the registers are loaded with the current values of C[18] to C[30]. The bytes of Bu corresponding to the respective A[j] which are added to registers are shown without hatching while the bytes that are added to RAM positions are shown with hatching.

The procedure according to the pseudo-code given above starts with processing the first window of every word of A by setting addr_mode=0.

For every processed word of A, the corresponding $B_u$ is added to C. Thereby u is defined by setting element_sel to the value of the currently processed byte of A. Since, addr_mode=0, the first window of A will be interpreted to determine u. The addition is then performed with the virtual element, which points to the right $B_u$.

This addition is realized with two subroutines. The processing jumps into these routines according to the number of iteration in the loop.

The first subroutine is written according to the addition in the first iteration of the loop starting with adding VE[0] to C[0]. Thereby the available registers are used to reduce the number of memory accesses. If n registers are available, then the first (t−n) additions are done by loading the first words of C, adding the words of $B_u$, and storing the result back to C. The result of the remaining additions are stored in registers, which are set to zero before addition. Thus, in this example where 13 registers are available, the first eight words VE[0] . . . VE[7] of the virtual element are added to C[0] . . . C[7]. The addition of the next 13 words is done with registers. Thus Bu[8] is added to the first register, Bu[9] to the second and so on. After VE[20], is processed, the first subroutine returns.

When considering the processing of the second byte of A, it is not necessary to alter the value of C[0]. Thus the processing jumps directly to the line where C[1] is changed. However, the line indicates that the value of VE[1] is added to C[1]—but now the first byte of $B_u$ is needed. Therefore the parameter neg_offset is set to one, and VE[1] points to $B_u$[0], VE[2] points to $B_u$[1] and so on. In general, when processing the $i^{th}$ byte of A, the parameter neg_offset is set to i and the virtual element used in the subroutine points to the actual required addresses.

In the second iteration of the loop, the first subroutine returns after $B_u$[19] has been added to an register. This means that still the addition of $B_u$[20] is necessary. Therefore, the second subroutine is used. The subroutine starts adding VE[21] to C[30], then adds VE[19] to C[28] and so on. The subroutine returns after the addition of VE[12] to C[21].

When the second iteration of the addition loop is executed, just one byte has to be added with this subroutine. Thus the processing jumps to the last addition of the second subroutine. To get the right mapping to the currently needed byte of the parameter offset_sel is set to 9. Hence, in the second iteration VE[12] is added to C[21]. The virtual address VE[12] points to $B_u$[12−neg_offset_sel+offset_sel]=Bu[20]. Before the second subroutine returns, the parameter offset_sel is set to zero. When the third iteration of the addition loop is executed the last two words are added with this subroutine. Therefore the processing jumps into the penultimate addition of the subroutine. The remaining iterations are realized in the same manner.

This procedure is repeated for the first ten iterations. The pattern of the remaining additions is very similar and thus same code can be used. It is just necessary to store the registers to the according positions in C. Thus, in the example that 13 registers are available, the value of the first register is stored to C[13], the value of the second to C[14] and so on.

Thereafter the values of the registers are loaded from C. The first register gets the value of C[18], the second register gets the value of C[19] and so forth. The parameter offset C_sel is set to 10, so that the operations are performed on the right words of C, when repeating the procedure.

When the second window is processed, the parameter addr_mode_sel is set to one and the whole processing as described above is performed again. The processing then looks similar as illustrated in FIG. 5 but the bits [3:0] of A[j] are used to determine u.

In the following, an example is given for the $13^{th}$ iteration of the processing, i.e. for the processing of the first window of A[12]=$01100111_b$.

Set parameters:
    addr_mode_sel=0
    element_sel=$01100111_b$
    neg_offset_sel=2 offset_sel=0
offsetC_sel=10
→u=$6_d$. Thus, the virtual addresses point to $B_6$.
Jump to line ADD_B1_2 of first subroutine:
   Add VE[2] to C[2]→
   adds $B_6$[2+offset_sel-neg_offset_sel] to C[2+offsetC_sel],
   thus $B_6$[0] is added to C[12]
   Add VE[3] to C[3]→adds $B_6$[1] to C[13]
   . . .
   Add VE[6] to C[6]→adds $B_6$[4] to C[16]
   Add VE[7] to C[7]→adds $B_6$[5] to C[17]
   Add VE[8] to R0→adds $B_6$[6] to the first register
   Add VE[9] to R1→adds $B_6$[7] to the second register
   . . .
   Add VE[20] to R12→adds $B_6$[18] to $13^{th}$ register
   Subroutine returns
Set offset_sel=9
Jump to line ADD_B2_2 of second subroutine:
   Add VE[13] to C[22]→adds $B_6$[20] to C[32]
   Add VE[12] to C[21]→adds $B_6$[19] to C[31]
   Set offset_sel=0
   Subroutine returns While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A cryptographic processing device configured to perform a cryptographic operation based on a multiplication of a first polynomial with a second polynomial; wherein the cryptographic processing device comprises:
a first memory storing a representation of the first polynomial;
a controller configured to separate the first polynomial into parts;
a second memory storing pre-determined results of the multiplications of the second polynomial with possible forms of the parts of the first polynomial;
a third memory for storing the result of the multiplication;
an address logic, configured to determine, for each part of the first polynomial, a start address of a memory block of the second memory based on the form of the part and the location of the part within the first polynomial;
an adder configured to add, for each determined address of the memory block of the second memory, the content of the memory block of the second memory at least partially to the contents of the third memory, wherein the data element of the third memory to which the content of a data element of the memory block of the second memory is added is the same for a plurality of the parts of the first polynomial.

2. The processing device of claim 1, wherein each part of the first polynomial includes a consecutive subset of terms of the first polynomial according to an ordering of the terms of the first polynomial according to increasing or decreasing exponent.

3. The processing device of claim 2, wherein the parts of the first polynomial include an equal number of coefficients of the polynomial.

4. The processing device of claim 1, wherein the representation of the first polynomial is the set of coefficients of the first polynomial.

5. The processing device of claim 1, wherein the possible forms of the parts of the first polynomial include the possible combinations of possible coefficients of the parts.

6. The processing device of claim 1, wherein the third memory includes register memory elements and RAM memory elements.

7. The processing device of claim 1, wherein the address logic is configured to determine the start address of the memory block of the second memory based on the form of the part such that the memory block of the second memory at least partially includes the pre-determined result of the multiplications of the second polynomial with the form of the part of the first polynomial.

8. The processing device of claim 1, wherein the address logic is configured to determine the start address of the memory block of the second memory based on the location of the part within the first polynomial such that the memory block of the second memory includes the pre-determined result of the multiplications of the second polynomial with the form of the part of the first polynomial in data elements which the adder adds to data elements of the third memory corresponding to the location of the part within the first polynomial.

9. The processing device of claim 1, wherein the address logic is configured to determine the start address of the memory block of the second memory based on the location of the part within the first polynomial such that the memory block of the second memory includes the pre-determined result of the multiplications of the second polynomial with the form of the part of the first polynomial in data elements which the adder adds to data elements of the third memory corresponding to exponents of the result of the polynomial multiplication as given by the exponents of the part of the first polynomial.

10. The processing device of claim 1, wherein each data element of the first memory is configured to store the coefficient of a term of the first polynomial having an exponent associated with the data element.

11. The processing device of claim 1, wherein each data element of the second memory is configured to store the coefficient of a term of a result of the multiplications of the second polynomial with a form of the parts of the first polynomial having an exponent associated with the data element.

12. The processing device of claim 1, wherein each data element of the third memory is configured to store the coefficient of a term of the result of the polynomial multiplication having an exponent associated with the data element.

13. The processing device of claim 1, wherein the first polynomial and the second polynomial are polynomials with binary coefficients.

14. The processing device of claim 1, wherein the address logic is configured to determine a candidate start address of the memory block of the second memory based on the form of the part and an address offset based on the location of the part within the first polynomial and to determine the start address of the memory block of the second memory based on the candidate start address and the offset.

15. The processing device of claim 14, wherein the candidate start address is the start address in the second memory of the pre-determined result of the multiplications of the second polynomial with the part of the first polynomial.

16. The processing device of claim 1, wherein the data element of the third memory to which the content of a data element of the memory block of the second memory is added is constant for a first subset of the parts of the first polynomial and is constant for a second subset of the parts of the first polynomial.

17. The processing device of claim 16, wherein the first subset and the second subset are each subsets of consecutive parts of the first polynomial according to an ordering of the parts of the first polynomial according to increasing or decreasing exponent.

18. A method for performing a cryptographic operation based on a multiplication of a first polynomial with a second polynomial wherein the method comprises:
- storing a representation of the first polynomial in a first memory;
- separating the first polynomial into parts;
- storing pre-determined results of the multiplications of the second polynomial with possible forms of the parts of the first polynomial in a second memory;
- determining, for each part of the first polynomial, a start address of a memory block of the second memory based on the form of the part and the location of the part within the first polynomial;
- adding, for each determined address of the memory block of the second memory, the content of the memory block of the second memory at least partially to the contents of a third memory for storing the result of the multiplication, wherein the data element of the third memory to which the content of a data element of the memory block of the second memory is added is the same for a plurality of the parts of the first polynomial; and
- performing a cryptographic operation.

* * * * *